(12) United States Patent
Yamamoto et al.

(10) Patent No.: US 8,170,300 B2
(45) Date of Patent: May 1, 2012

(54) BIOMETRIC IMAGE PICKUP APPARATUS

(75) Inventors: Kenji Yamamoto, Kanagawa (JP); Isao Ichimura, Tokyo (JP)

(73) Assignee: Sony Corporation, Tokyo (JP)

( * ) Notice: Subject to any disclaimer, the term of this patent is extended or adjusted under 35 U.S.C. 154(b) by 979 days.

(21) Appl. No.: 12/213,903

(22) Filed: Jun. 26, 2008

(65) Prior Publication Data

US 2009/0016578 A1    Jan. 15, 2009

(30) Foreign Application Priority Data

Jul. 10, 2007   (JP) ................................. 2007-181075

(51) Int. Cl.
G06K 9/20 (2006.01)
(52) U.S. Cl. .......................................... 382/124; 396/15
(58) Field of Classification Search .................. 382/124, 382/127, 128; 396/15
See application file for complete search history.

(56) References Cited

U.S. PATENT DOCUMENTS

| | | | |
|---|---|---|---|
| 2006/0110145 A1 | 5/2006 | Fujimoto et al. | |
| 2007/0270666 A1* | 11/2007 | Amano et al. ................ | 600/300 |
| 2008/0075330 A1* | 3/2008 | Matsumura et al. .......... | 382/115 |
| 2008/0107309 A1* | 5/2008 | Cerni ............................ | 382/115 |

FOREIGN PATENT DOCUMENTS

| | | |
|---|---|---|
| JP | 10-289304 | 10/1998 |
| JP | 2002-533848 | 10/2002 |
| JP | 2005-191749 A | 7/2005 |
| JP | 2005-312748 | 11/2005 |
| JP | 2005-312887 | 11/2005 |
| JP | 2006-146612 | 6/2006 |
| JP | 2006-155575 | 6/2006 |
| JP | 2006-181296 | 7/2006 |
| JP | 2006285487 A * | 10/2006 |
| JP | 2007-330769 A | 12/2007 |
| WO | WO-00/39744 | 7/2000 |
| WO | WO-2004/088588 A1 | 10/2004 |

OTHER PUBLICATIONS

Specification of U.S. Appl. No. 09/869,032, related to WO 00/39744.*
Japanese Office Action issued Aug. 10, 2010 for corresponding Japanese Application No. 2007-181075.
Japanese Office Action issued Apr. 28, 2009 for corresponding Japanese Application No. 2007-181075.

* cited by examiner

*Primary Examiner* — Clayton E LaBalle
*Assistant Examiner* — Leon W Rhodes, Jr.
(74) *Attorney, Agent, or Firm* — Rader, Fishman & Grauer, PLLC

(57) ABSTRACT

A biometric image pickup apparatus with a simple configuration capable of reducing light amount variations in a picked-up image. The biometric image pickup apparatus includes: a light source applying light to a living organism; a detection section for placing the living organism thereon; an image pickup lens section condensing light from the living organism; an image pickup device obtaining image pickup data on the basis of the light condensed by the image pickup lens section; and a transmittance distribution filter arranged between the detection section and the image pickup device, in which the transmittance distribution filter has a transmittance distribution in which the transmittance is higher in a region far from the light source than in a region near the light source.

14 Claims, 10 Drawing Sheets

BIOMETRIC IMAGE PICKUP APPARATUS

CROSS REFERENCES TO RELATED APPLICATIONS

The present invention contains subject matter related to Japanese Patent Application JP 2007-181075 filed in the Japanese Patent Office on Jul. 10, 2007, the entire contents of which being incorporated herein by reference.

BACKGROUND OF THE INVENTION

1. Field of the Invention

The present invention relates to a biometric image pickup apparatus picking up an image of the structure of a living organism part such as a vein or a fingerprint.

2. Description of the Related Art

In related arts, biometric image pickup apparatuses picking up an image of the structure of a living organism part are used in biometrics authentication systems or the like, and various biometrics authentication systems performing authentication of a living organism, for example, through the use of image pickup data of fingerprints or veins have been proposed (for example, refer to Japanese Unexamined Patent Application Publication Nos. 2005-312748, 2006-181296, H10-289304, 2006-146612 and 2006-155575). Typically, in a biometrics authentication system, an image pickup apparatus has a large thickness, so in the case where the image pickup apparatus is applied to a low-profile device, a technique of arranging the image pickup apparatus outside an authentication system (for example, refer to Japanese Unexamined Patent Application Publication No. 2005-312748) and a technique of independently arranging an optical system (an image pickup lens) and a detection system (an image pickup device) (for example, refer to Japanese Unexamined Patent Application Publication No. 2006-181296) have been mainstream.

However, in recent years, according to a reduction in profiles of various devices, constraints of manufacturability or design, or the like, the implementation of a biometrics authentication system as a low-profile module capable of being directly mounted on such a device is desired. Therefore, in Japanese Unexamined Patent Application Publication No. 2006-155575, a low-profile image pickup optical system in which near-infrared light sources are arranged on both sides (the right and left sides) of a finger, thereby light is applied to the inside of the finger to obtain image pickup data of veins has been proposed.

SUMMARY OF THE INVENTION

However, in a configuration as shown in Japanese Unexamined Patent Application Publication No. 2006-155575, there is an issue that by an influence of transmittance through a finger, the light amount in a region near the light source is large and the light amount in a region far from light source is small, so the light amount distribution in an image becomes uneven. Therefore, in Japanese Unexamined Patent Application Publication No. 2006-155575, a plurality of light sources are arranged, and a computing section determining whether or not the light amount distribution in an image pickup region falls in a predetermined range is arranged, thereby a light source to be driven is appropriately selected, and while the amount of light applied from each light source is adjusted, an image is picked up. Therefore, there is an issue that a complicated light amount adjusting mechanism is necessary.

In view of the foregoing, it is desirable to provide a biometric image pickup apparatus with a simple configuration capable of reducing light amount variations in a picked-up image.

According to an embodiment of the invention, there is provided a biometric image pickup apparatus including: a light source applying light to a living organism; a detection section for placing the living organism thereon; an image pickup lens section condensing light from the living organism; an image pickup device obtaining image pickup data on the basis of the light condensed by the image pickup lens section; and a transmittance distribution filter arranged between the detection section and the image pickup device, in which the transmittance distribution filter has a transmittance distribution in which the transmittance is higher in a region far from the light source than in a region near the light source.

In the biometric image pickup apparatus according to the embodiment of the invention, by the transmittance distribution filter which is arranged between the detection section and the image pickup device and has a higher transmittance in a region far from the light source than in a region near the light source, the amount of light passing through the region near the light source in light entering from the living organism to the image pickup device is smaller than the amount of light passing through the region far from the light source. Thereby, in an image pickup region, the light amount in the region near the light source is smaller than that in the region far from the light source, and a difference between the light amounts in the regions is reduced. Moreover, unlike related arts, it is not necessary to selectively drive the light source, or to arrange a mechanism for adjusting the amount of light applied from the light source.

In the biometric image pickup apparatus according to the embodiment of the invention, the transmittance distribution filter in which the transmittance is higher in the region far from the light source than in the region near the light source is arranged between the detection section and the image pickup device, so without complicated light amount adjustment, a difference between the light amount in the region near the light source and the light amount in the region far from the light source is reduced. Moreover, unlike the related arts, it is not necessary to perform complicated light amount adjustment. Therefore, light amount variations in a picked-up image are able to be reduced with a simple configuration.

Other and further objects, features and advantages of the invention will appear more fully from the following description.

DETAILED DESCRIPTION OF THE PREFERRED EMBODIMENTS

A preferred embodiment will be described in detail below referring to the accompanying drawings.

Figure 1:
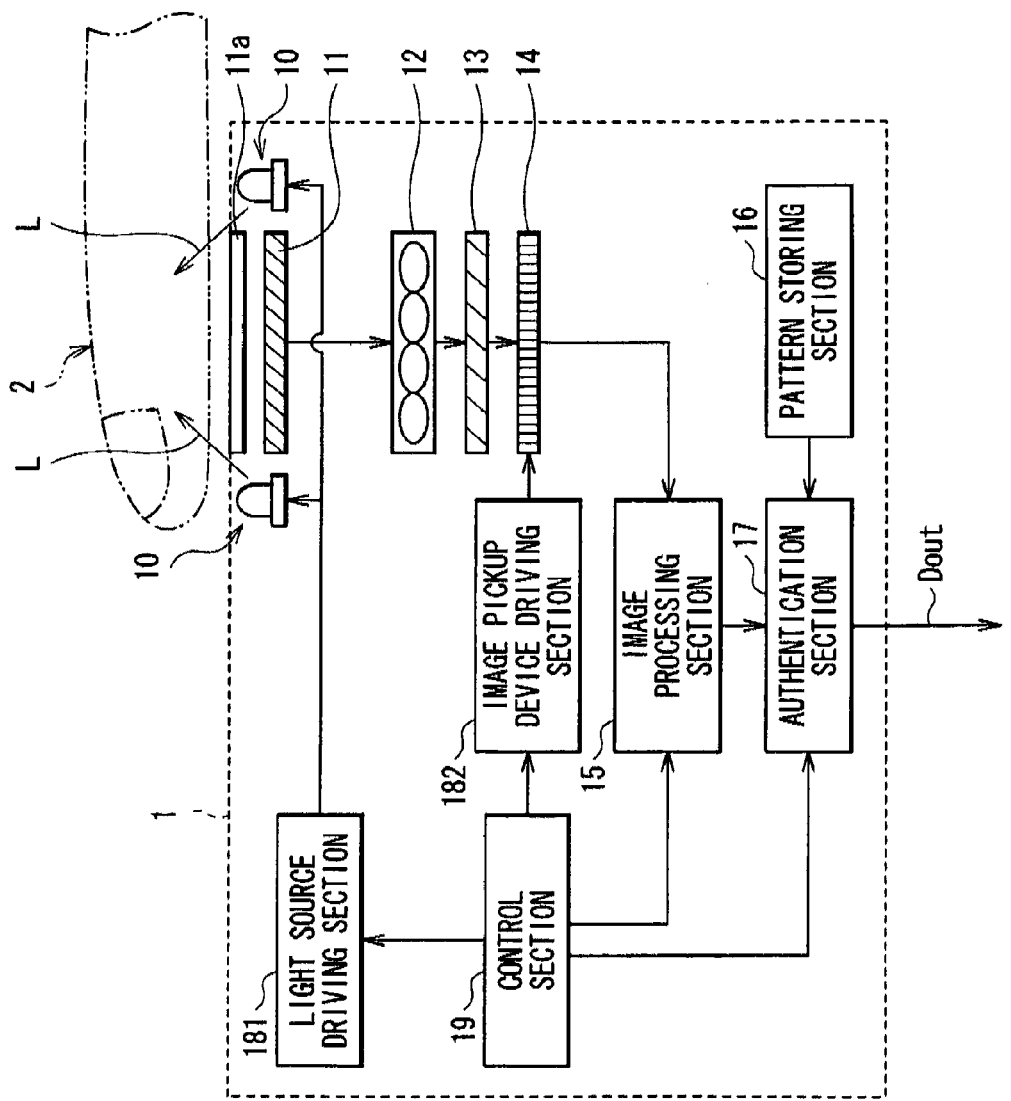
FIG. 1 is a functional block diagram showing the whole configuration of a biometrics authentication system according to an embodiment of the invention.
Figure 2:
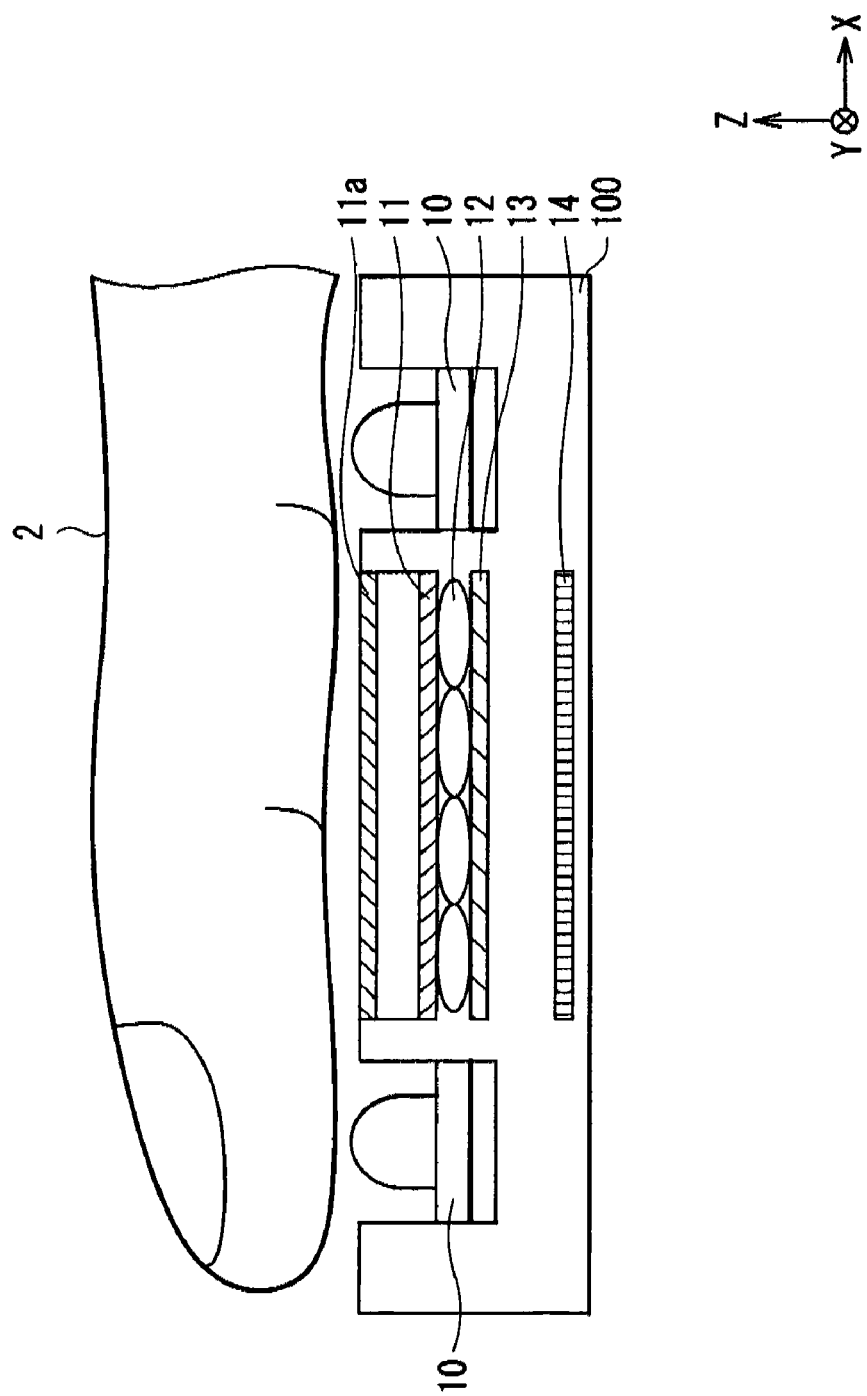
FIG. 2 is a schematic sectional view of the biometrics authentication system shown in FIG. 1.
Figure 3:
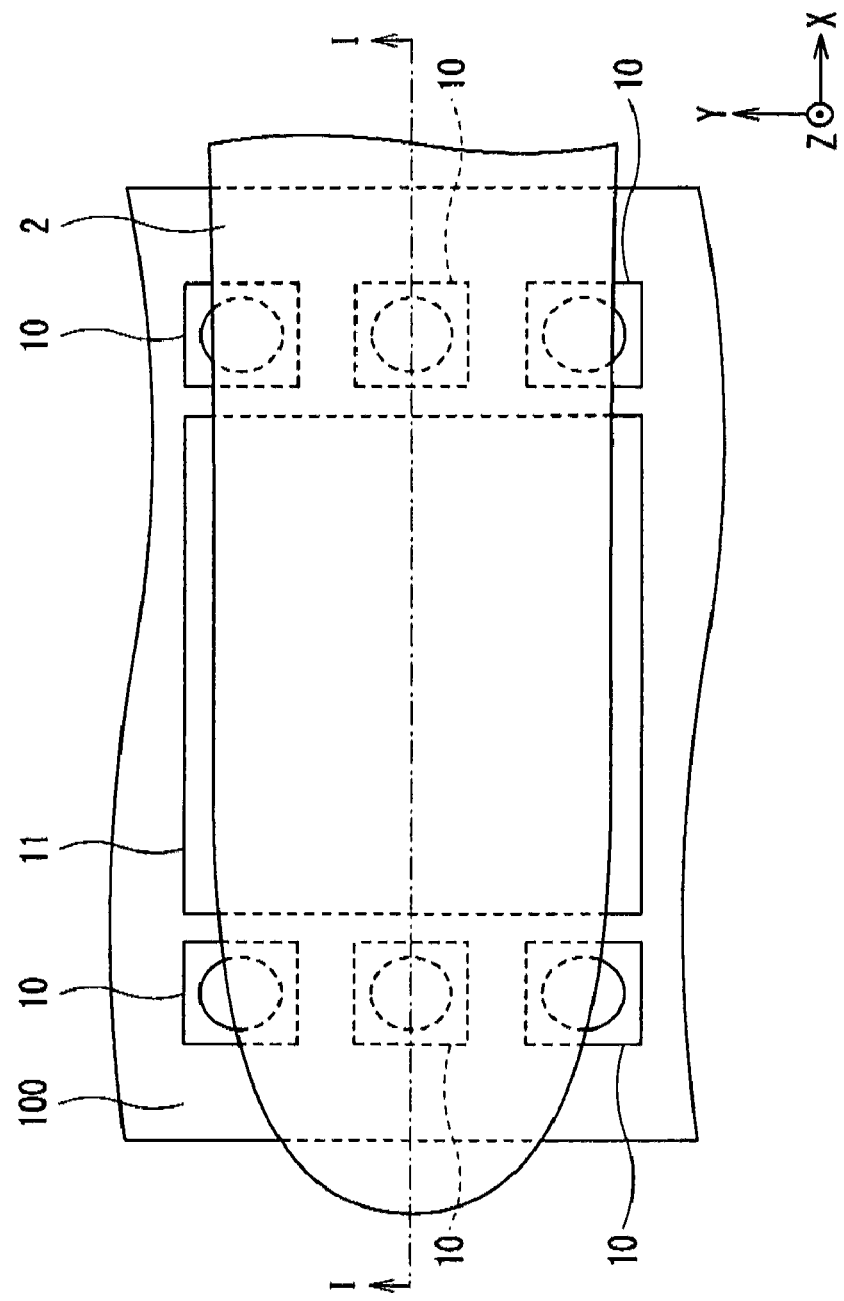
FIG. 3 is a schematic plan view of the biometrics authentication system shown in FIG. 1.

FIG. 1 shows the whole configuration of a biometrics authentication system 1 according to an embodiment of the invention. FIG. 2 shows a z-x sectional view of the biometrics authentication system 1. FIG. 3 shows an x-y plan view of the biometrics authentication system 1 viewed from a living organism 2. FIG. 2 is a sectional view taken along a line I-I of FIG. 3 viewed from an arrow direction. The biometrics authentication system 1 specifically picks up an image of the structure of the living organism (for example, a fingertip) 2, for example, veins or a fingerprint to perform authentication, and includes light sources 10, a detection section 11a, a transmittance distribution filter 11, a microlens array 12, a near-infrared pass filter 13, an image pickup device 14, an image processing section 15, a pattern storing section 16, an authentication section 17, a light source driving section 181, an image pickup device driving section 182 and a control section 19.

The light sources 10 apply light to the living organism 2 as an object subjected to image pickup, and are made of, for example, an LED (Light Emitting Diode) or the like. The light sources 10 are arranged on the same side as a side where the image pickup device 14 is arranged relative to the living organism 2, for example, in both end positions in the longitudinal direction (an x direction) of the living organism 2. In the case where veins of the living organism 2 are an object subjected to image pickup, the light sources 10 preferably emit light of a near-infrared wavelength region (a wavelength region approximately from 700 nm to 1200 nm). It is because in the case where light of such a wavelength region is used, by the balance between the transmittance through a living organism and the absorption into reduced hemoglobin (veins) in the living organism, light use efficiency is able to be improved.

The detection section 11a is made of, for example, a cover glass or the like, and is a region (plane) where the living organism 2 is detected, that is, a region (plane) where the living organism 2 is placed. However, in the embodiment, the detection section 11a may not be arranged, and the living organism 2 may be placed on the transmittance distribution filter 11 which will be described later. Moreover, the living organism 2 does not necessarily make direct contact with the detection section 11a (or the transmittance distribution filter 11), and the living organism 2 may be placed above the detection section 11a.

The transmittance distribution filter 11 is configured so that the transmittance is different depending on regions thereof. The specific configuration of the transmittance distribution filter 11 will be described later.

The microlens array 12 includes a plurality of microlenses arranged in a matrix form, and is arranged, for example, below the transmittance distribution filter 11 so that an image of a desired observation plane inside the living organism 2 is formed on a light-receiving plane on the image pickup device 14. The microlens array 12 functions as an image pickup lens for picking up an image of the living organism 2 as an object subjected to image pickup, and condenses light applied to the living organism 2. Moreover, as microlenses, for example, liquid crystal lenses, liquid lenses, diffractive lenses and the like may be used. In particular, the liquid crystal lenses and the liquid lenses are capable of changing their focal positions, so double biometrics authentication including vein authentication and fingerprint authentication is able to be performed, and higher safety is able to be secured. Moreover, the microlens array 12 is able to be formed so that its lens conjugation length (a distance from a lens plane on an object side to an image pickup plane) is as thin as approximately 1 mm, so the thickness of the whole system is able to be as thin as approximately 3 mm. However, the image pickup lens is not limited to such a microlens array, and a single lens may be used.

The near-infrared pass filter 13 is a filter selectively allowing light of an near-infrared wavelength region to pass through, and is arranged, for example, below the microlens array 12. The near-infrared pass filter 13 is made of, for example, a material formed by adding a copper phthalocyanine-based compound, a metal-free phthalocyanine-based compound, an anthraquinone-based dye or the like to an acrylic-based resin, and has, for example, a thickness of 0.1 mm to 0.5 mm. When such a near-infrared pass filter 13 is arranged, outside light or the like is eliminated, and clear image pickup data (a vein image) is easily obtained.

The image pickup device 14 receives light from the microlens array 12 to obtain image pickup data, and is arranged on a focal plane of the microlens array 12. The image pickup device 14 includes a plurality of CCDs (Charge Coupled Devices), CMOSs (Complementary Metal Oxide Semiconductors) or the like arranged in a matrix form.

The image processing section 15 performs predetermined image processing on the image pickup data obtained in the image pickup device 14 in response to the control of the control section 19 to output the image pickup data to the authentication section 17. In addition, the image processing section 15, and the authentication section 17 and the control section 19 which will be described later each include, for example, a microcomputer or the like.

The pattern storing section 16 is a section storing a biometrics authentication pattern (which is a comparison pattern relative to an image pickup pattern obtained at the time of authentication, and which is obtained by picking up an image of a living organism in advance), and includes a nonvolatile memory device (for example, an EEPROM (Electrically Erasable Programmable Read Only Memory) or the like).

The authentication section 17 is a section performing authentication of the living organism 2 by comparing an image pickup pattern outputted from the image processing section 15 to the biometrics authentication pattern stored in the pattern storing section 16 in response to the control of the control section 19.

The light source driving section 181 drives the light sources 10 to emit light in response to the control of the control section 19. The image pickup device driving section 182 drives the image pickup device 14 to pick up an image (to receive light) in response to the control of the control section 19. The control section 19 controls the operations of the image processing section 15, the authentication section 17, the light source driving section 181 and the image pickup device driving section 182.

Figure 4A:
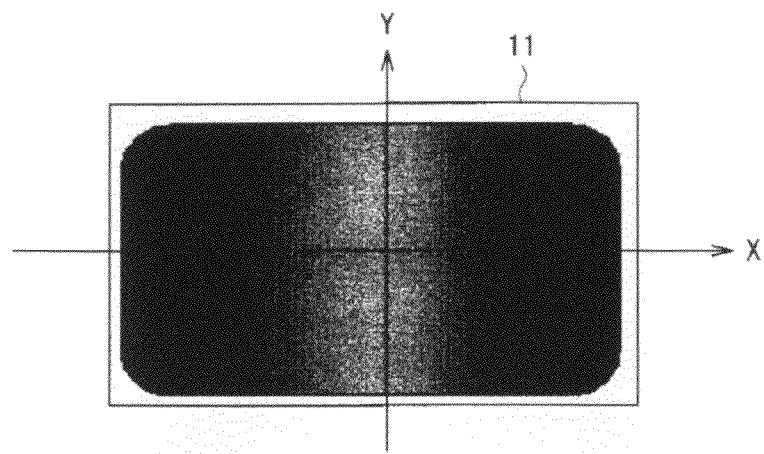
FIGS. 4A and 4B are illustrations showing an example of a transmittance distribution filter.

Next, the configuration of the transmittance distribution filter 11 will be described in detail referring to FIGS. 4A and 4B. FIG. 4A is a schematic view showing a transmittance distribution in an xy plane of the near-infrared pass filter 13, and FIG. 4B is a plot showing a transmittance distribution in an x direction.

The transmittance distribution filter 11 has a transmittance distribution in which the transmittance in a region far from each of the light sources 10 is higher than that in a region near each of the light sources 10. Moreover, the transmittance distribution filter 11 preferably has a transmittance distribution in which the transmittance gradually increases with distance from the light sources 10. Alternatively, the transmittance distribution filter 11 preferably has a quadratic transmittance distribution in which the transmittance increases with distance from the light sources 10.

Figure 4B:
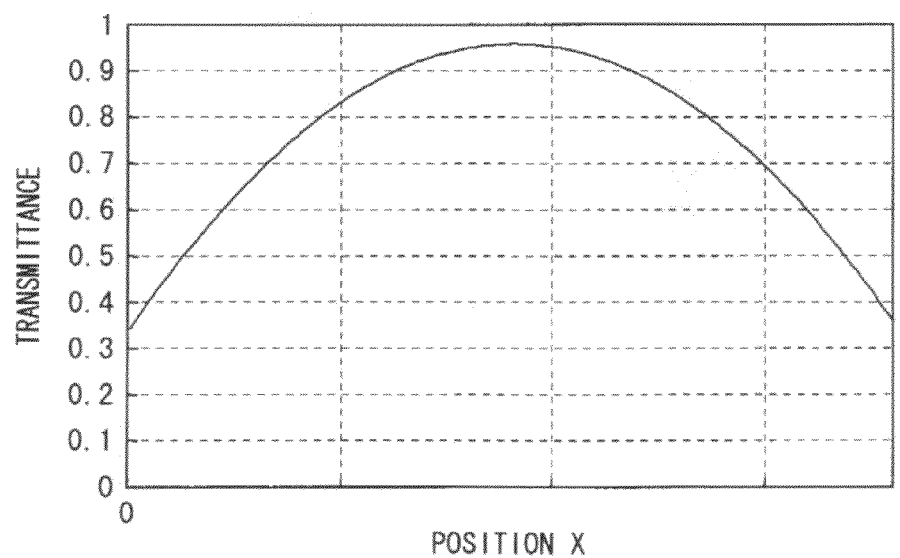

For example, as shown in FIGS. 4A and 4B, the transmittance distribution filter 11 is configured so as to have the quadratic transmittance distribution in the x direction. In FIG. 4A, shading in the x-y plane indicates a difference in transmittance, and in a dark part, the transmittance is relatively low, and in a light part, the transmittance is relatively high. Moreover, the transmittance distribution on a line where the distance from the light source 10 is equal, that is, the transmittance distribution on a y direction is constant. The transmittance distribution filter 11 is made of, for example, a material such as a chromium (Cr) thin film or an ND filter, and the thickness of the transmittance distribution filter 11 including a base material is, for example, 0.1 mm to 0.5 mm.

Moreover, for example, a film of a thin film organic material formed by a dry process, a coating of a light absorption material, or the like is formed on a film material having transparency, more specifically a resin film or the like so that the transmittance distribution filter 11 has a different thickness in each region, thereby the above-described transmittance distribution is able to be obtained. Alternatively, a resin film may be kneaded with a light absorption material, thereby the transmittance distribution filter 11 may be formed so that the resin film has a different thickness in each region.

Next, functions and effects of such a biometrics authentication system 1 will be described below.

At first, basic functions of the biometrics authentication system 1 will be described below referring to FIGS. 1 to 3. In the biometrics authentication system 1, at first, when the living organism (for example, a fingertip) 2 is placed on the detection section 11a (above the transmittance distribution filter 11), and the light sources 10 are driven by the light source driving section 181, light L emitted from the light sources 10 is applied to the living organism 2. The light applied to the living organism 2 is scattered, for example, in the living organism 2, and is absorbed into veins. On the other hand, the microlens array 12 is arranged so that an image of a desired observation plane inside the living organism 2 is formed on a light-receiving plane on the image pickup device 14, so after light inside the living organism 2 is condensed by the microlens array 12, the light enters into the image pickup device 14 through the near-infrared pass filter 13. Thus, in the image pickup device 14, vein image pickup data (a vein pattern) of the living organism 2 is obtained.

Thus, after the image processing section 15 performs appropriate image processing on the vein pattern obtained by the image pickup device 14, the vein pattern is inputted into the authentication section 17. In the authentication section 17, the inputted vein pattern is compared to an authentication pattern for vein authentication stored in the pattern storing section 16, thereby authentication is performed. Accordingly, a final biometrics authentication result (authentication result data Dout) is outputted, thereby biometrics authentication is completed.

Figure 5:
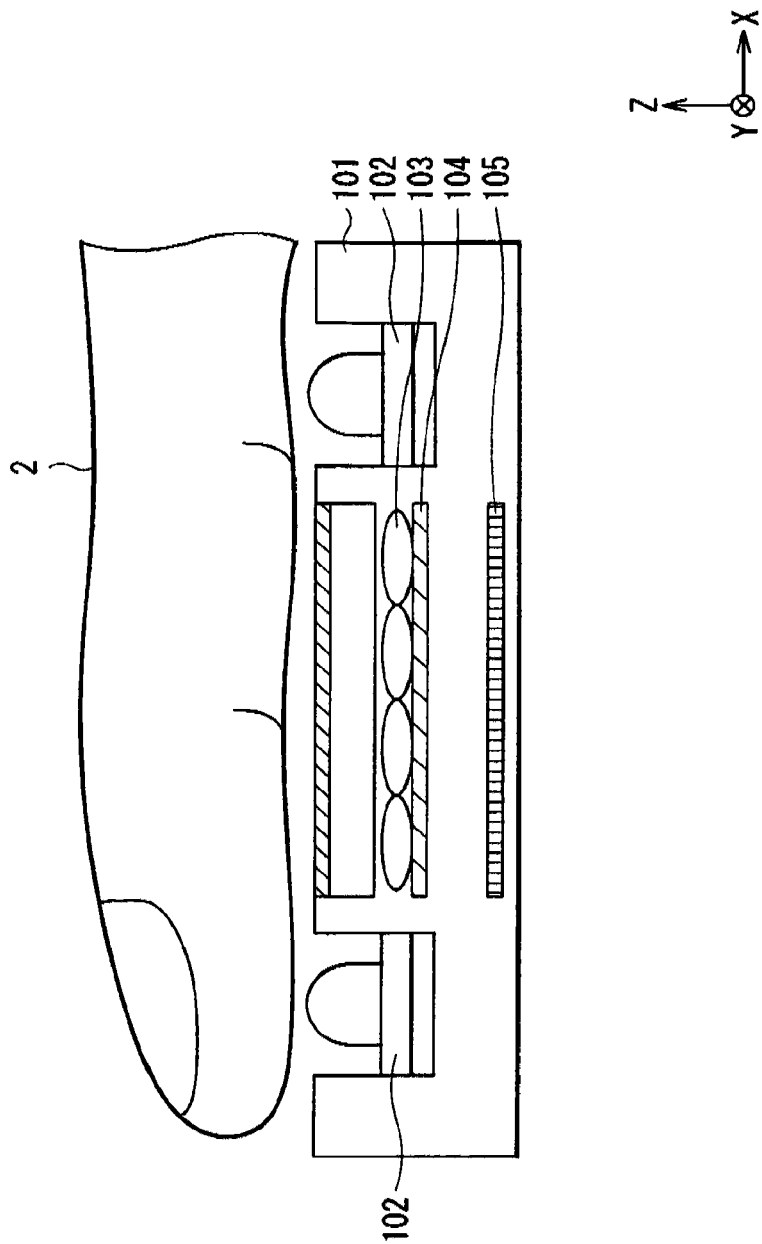
FIG. 5 is a schematic sectional view of a biometrics authentication system in a related art.
Figure 6A:
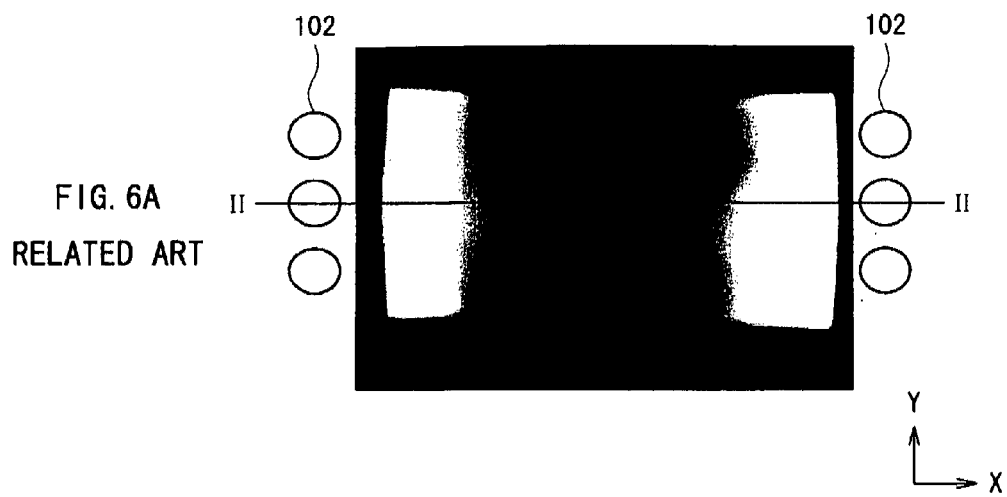
FIGS. 6A and 6B are illustrations showing an image and a light amount distribution in the case where image pickup is performed by the biometrics authentication system in the related art.
Figure 6B:
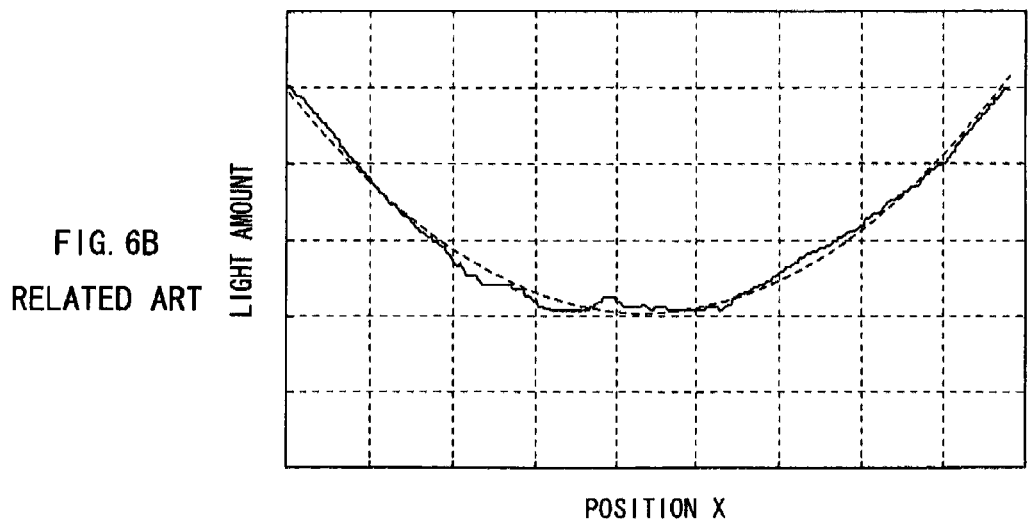

Next, characteristic functions of the biometrics authentication system 1 will be described referring to FIGS. 1 to 4B and 4B and 7A and 7B in comparison with a related art example shown in FIGS. 5, 6A and 6B. FIG. 5 shows a z-x sectional view showing a schematic configuration of a biometrics authentication system in a related art. FIG. 6A shows a picked-up image in the biometrics authentication system shown in FIG. 5, and FIG. 6B shows a light amount distribution around a line II-II of FIG. 6A (in an x direction). As shown in FIG. 5, in the related art, an image pickup lens 103 such as a microlens array, a near-infrared pass filter 104, and an image pickup device 105 are arranged in this order below the living organism 2, and when light emitted from light sources 102 is applied to the living organism 2, the light is scattered inside the living organism 2, and is absorbed into veins, and then the light is condensed by the image pickup lens 103, and an image is formed in the image pickup device 105.

In such a configuration in the related art, by an influence of the transmittance through the living organism 2, light is applied to the living organism 2 so that the light amount in a region near each of the light sources 102 is large, and the light amount in a region far from each of the light sources 102 is small. Thereby, variations in the light amount distribution in a picked-up image occur. Therefore, to prevent such variations in the light amount, complicated light amount adjustment such as selectively driving a plurality of light sources or adjusting the amount of light applied from each light source is necessary.

On the other hand, in the embodiment, the transmittance distribution filter 11 is arranged between the living organism 2 and the image pickup device 14, and the transmittance is controlled to be low in a region near each of the light sources 10 and to be high in a region far from each of the light sources 10, so the amount of light passing through the region near each of the light sources 10 in light entering from the living organism 2 to the image pickup device 14 is reduced. Therefore, in an image pickup region, the light amount in the region near a light source is smaller than that in the region far from the light source, so a difference between the light amounts in the regions is reduced. Moreover, unlike the related art, complicated light amount adjustment is not necessary.

Moreover, as shown in FIG. 6B, the light amount distribution in the x direction tends to decrease with distance from the light source while drawing a substantially quadratic curve. When the transmittance distribution in the x direction of the transmittance distribution filter 11 becomes a quadratic distribution showing a change characteristic opposite to a change characteristic shown in FIG. 6B, a difference in the light amount is adjusted finely.

Thus, in the embodiment, the transmittance distribution filter 11 is arranged between the living organism 2 and the image pickup device 14, and the transmittance of the transmittance distribution filter 11 is adjusted so as to be higher in a region far from each of the light sources 10 than in a region near each of the light sources 10, thereby a difference between the light amount in the region near each of the light sources 10 and the light amount in the region far from each of the light sources 10 is able to be reduced without complicated light amount adjustment. Therefore, variations in the light amount are able to be reduced with a simple configuration.

Moreover, when the transmittance distribution filter 11 has a quadratic transmittance distribution in the x direction, a difference in the light amount is adjusted more finely, so the light amount distribution is able to be flattened (equalized).

Figure 7A:
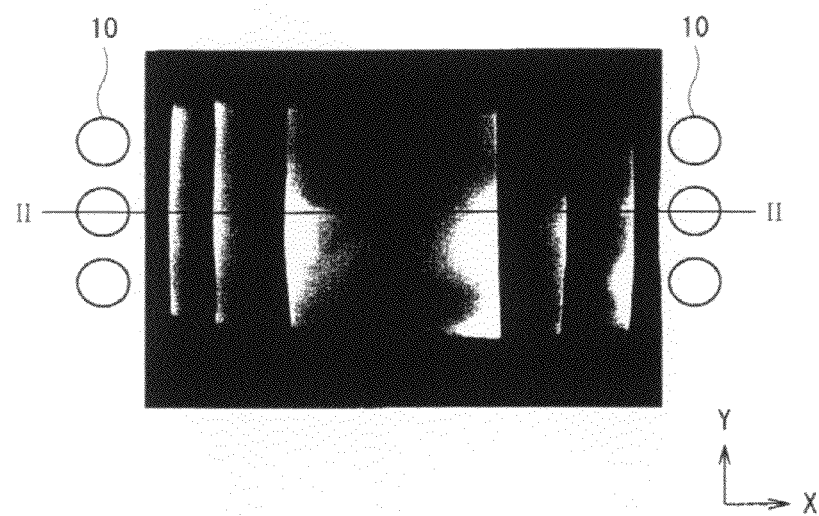
FIGS. 7A and 7B are illustrations showing an image and a light amount distribution in the case where image pickup is performed through the use of the transmittance distribution filter.
Figure 7B:
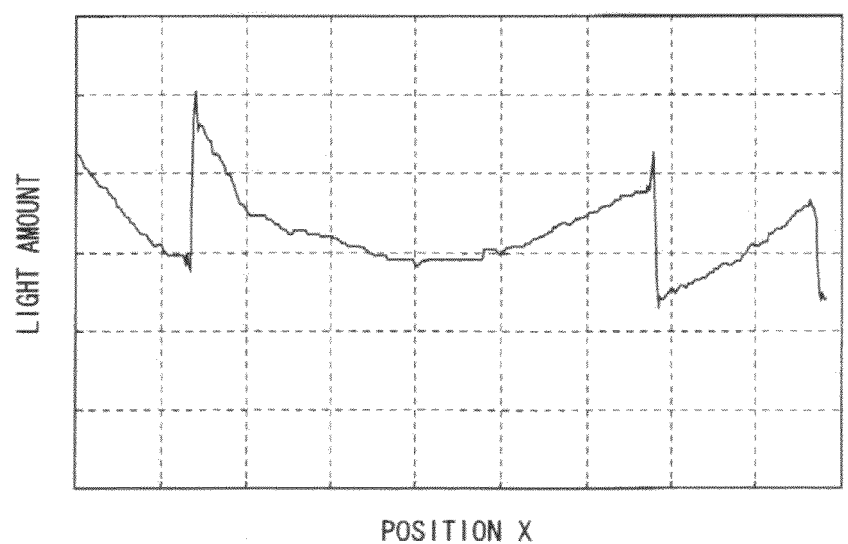

Further, even in the case where the transmittance distribution filter 11 is configured so that the transmittance gradually increases with distance from the light sources 10, variations in the light amount are able to be effectively reduced. FIGS. 7A and 7B show the result of a picked-up image in the case where the transmittance distribution in the x direction gradually increases with distance from the light sources 10. FIG. 7B is a plot showing the light amount distribution around a line A-A of FIG. 7A, that is, in the x direction. As shown in FIGS. 7A and 7B, compared to the related art (shown in FIGS. 6A and 6B), it is obvious that variations in the light amount is reduced, and an image of veins appears. Moreover, in the case where the transmittance distribution gradually increases in such a manner, the transmittance distribution is easily controlled, so it is advantageous in terms of costs or mass production, and manufacturability is improved.

In the case where the light sources 10 emit near-infrared light, while the transmittance of light through the living organism 2 is increased, light absorption into veins of the living organism 2 is able to be improved. Therefore, in the case where veins are an object subjected to authentication, veins are able to appear more clearly, and authentication precision is able to be improved.

Figure 8:
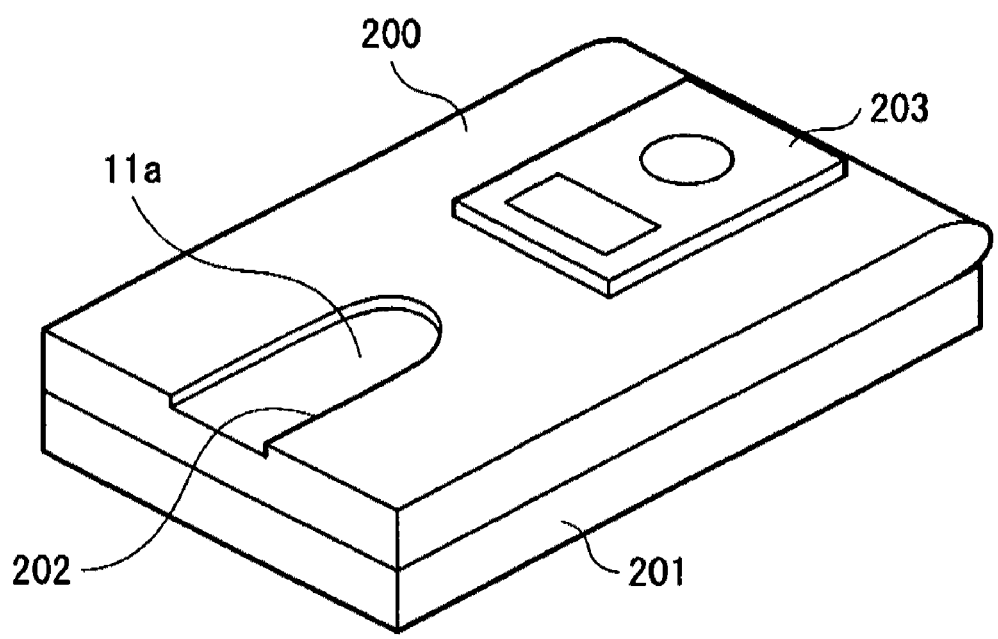
FIG. 8 is a perspective view showing an application example of the biometrics authentication system shown in FIG. 1.

The biometrics authentication system 1 is suitably applicable to low-profile portable modules such as cellular phones, low-profile laptop computers, portable memories and various cards. FIG. 8 is a schematic view of an example of a cellular phone using the biometrics authentication system 1. The cellular phone includes a finger guide 202 for placing the living organism 2 (a fingertip) thereon and a display section 203 displaying an authentication result on a surface of a flip-type enclosure (a first enclosure 200 and a second enclosure 201). The biometrics authentication system 1 is included in the first enclosure 200, and a bottom section of the finger guide 202 corresponds to the detection section 11a, and the transmittance distribution filter 11 is arranged below the finger guide 202.

Next, modifications of the invention will be described below.

Modification 1

Figure 9:
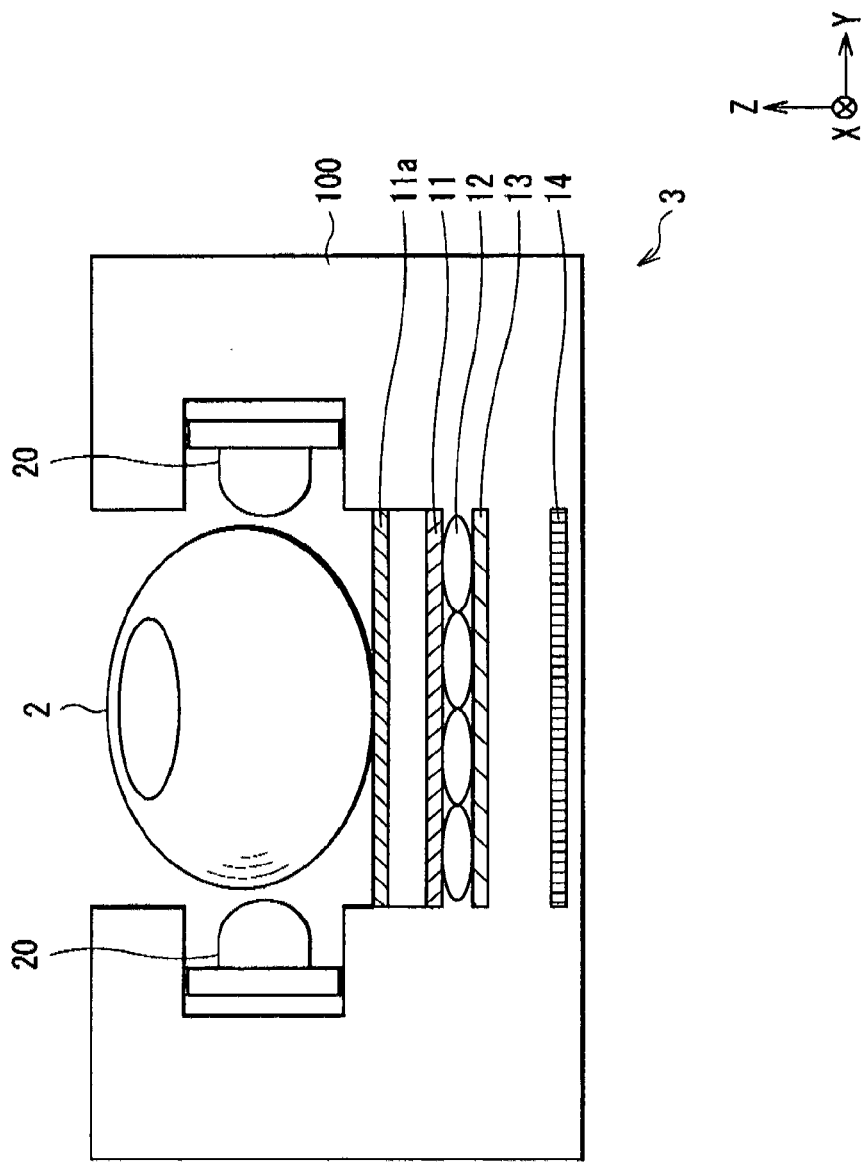
FIG. 9 is a schematic sectional view of a biometrics authentication system according to a first modification of the invention.

FIG. 9 shows a schematic sectional view of a biometrics authentication system 3 according to a modification 1 of the invention. The biometrics authentication system 3 has the same configuration as that of the biometrics authentication system 1 according to the above-described embodiment, except that the positions where light sources 20 are arranged are different, and the transmittance of the transmittance distribution filter 11 is set according to the positions of the light sources 20. Therefore, like components are denoted by like numerals as of the embodiment, and will not be further described.

In the biometrics authentication system 3, the light sources 20 are arranged in a lateral direction (a y direction) of the living organism 2 so as to face one another with the living organism 2 in between. The transmittance distribution filter 11 is configured so that the transmittance is low in a region near each of the light sources 20 and high in a region far from each of the light sources 20 along the lateral direction (the y direction) of the living organism 2.

Thus, the light sources 20 may be arranged so as to face one another in the lateral direction of the living organism 2, and in this case, when the transmittance distribution filter 11 is configured so that the transmittance changes according to the distance from the light sources 20, variations in the light amount are able to be reduced.

Modification 2

Figure 10:
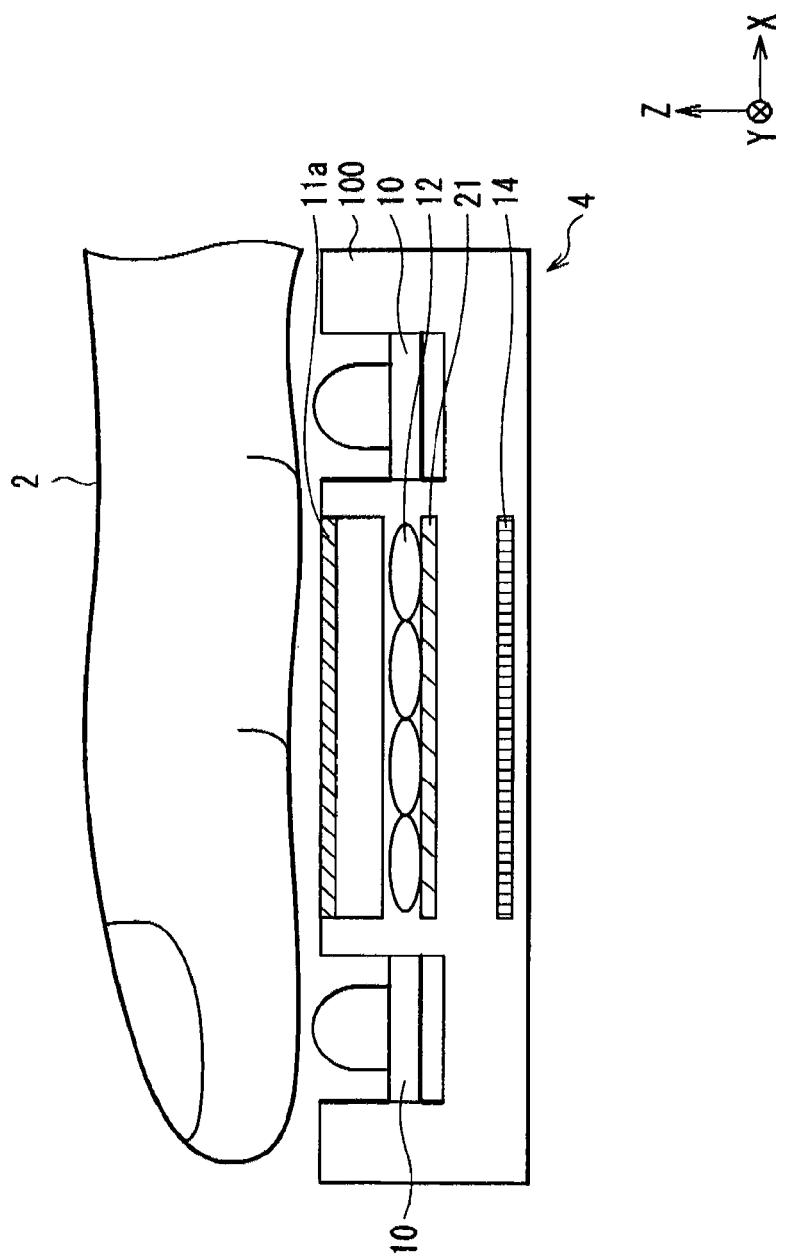
FIG. 10 is a schematic sectional view of a biometrics authentication system according to a second modification of the invention.

FIG. 10 shows a schematic sectional view of a biometrics authentication system 4 according to a modification 2 of the invention. The biometrics authentication system 4 has the same configuration as that of the biometrics authentication system 1 according to the above-described embodiment, except that a transmittance distribution filter 21 is arranged between the microlens array 12 and the image pickup device 14. Therefore, like components are denoted by like numerals as of the embodiment, and will not be further described.

As described above, unlike the biometrics authentication system 1 shown in FIGS. 2 and 3, the transmittance distribution filter 21 is not necessarily arranged between the living organism 2 and the microlens array 12, and when the transmittance distribution filter 21 is arranged between the living organism 2 and the image pickup device 14, variations in the amount of light entering from the living organism 2 to the image pickup device 14 is reduced. Moreover, in the modification, the transmittance distribution filter 21 also functions as the near-infrared pass filter in the above-described embodiment, and is made of the same material as that of the near-infrared pass filter. For example, the transmittance distribution filter 21 has a thickness distribution so that light of a used wavelength is absorbed at a predetermined ratio, thereby a transmittance distribution is formed.

Although the present invention is described referring to the embodiment, the invention is not limited to the embodiment, and may be variously modified.

For example, in the above-described embodiment, the case where biometrics authentication is performed on the basis of an obtained vein pattern is described; however, the invention is not limited to the case, and, for example, a fingerprint pattern and a vein pattern are obtained, and on the basis of these results, a final authentication result may be outputted. When both of fingerprint authentication and vein authentication are performed in such a manner, an authentication result with higher precision may be obtained.

Moreover, in the above-described embodiment, the biometrics authentication system is described as an example of the biometric image pickup apparatus; however, the biometric image pickup apparatus is not limited to the biometrics authentication system, and is applicable to any other image pickup apparatus, Further, in the above-described embodiment, the case where appropriate image processing is performed on image pickup data obtained in the image pickup device 14 in the image processing section 15, and then authentication is performed is described; however, for example, in some cases, the image processing section 15 may not be arranged, and the authentication section 17 may directly perform authentication on the basis of the image pickup data from the image pickup device 14. In such a configuration, the system configuration may be further simplified, and the profile of the whole system may be further reduced.

In the above-described embodiment, the configuration in which the light sources are arranged on both side positions in the longitudinal direction or the lateral direction of the living organism 2 is described as an example; however, the positions of the light sources are not limited to the configuration, and the effects of the invention are achieved with a configuration in which a light source is arranged only on one side of the living organism 2. Likewise, the number of light sources, and the kind, the size and the like of light source are not limited to the case described in the above-described embodiment, and are appropriately set depending on the specifications and the like of the system.

In the above-described embodiment, the microlens array in which a plurality of microlenses are arranged is described as an example of the image pickup lens; however, the image pickup lens is not limited to the microlens array, and an image may be picked up through the use of only one lens.

It should be understood by those skilled in the art that various modifications, combinations, sub-combinations and alterations may occur depending on design requirements and other factors insofar as they are within the scope of the appended claims or the equivalents thereof.

What is claimed is:

1. A biometric image pickup apparatus comprising:
   a light source applying light to a living organism;
   a detection section for placing the living organism thereon;
   an image pickup lens section condensing light from the living organism;
   an image pickup device obtaining image pickup data on the basis of the light condensed by the image pickup lens section; and
   a transmittance distribution filter arranged between the detection section and the image pickup device,
   wherein the transmittance distribution filter has a transmittance distribution in which the transmittance is higher in a region far from the light source than in a region near the light source, and
   wherein the detection section is configured such that the living organism does not make direct contact with the detection section.

2. The biometric image pickup apparatus according to claim 1, wherein
   in the transmittance distribution, the transmittance gradually increases with distance from the light source.

3. The biometric image pickup apparatus according to claim 1, wherein
   the transmittance distribution is a quadratic distribution in which the transmittance increases with distance from the light source.

4. The biometric image pickup apparatus according to claim 1, wherein
   a plurality of the light sources are arranged so as to face one another with the detection section in between.

5. The biometric image pickup apparatus according to claim 1, wherein
   the light source is arranged on the same side as a side where the image pickup device is arranged relative to the detection section.

6. The biometric image pickup apparatus according to claim 1, wherein
   the light source emits light of near-infrared wavelength region.

7. The biometric image pickup apparatus according to claim 1, further comprising:
   a near-infrared pass filter between the image pickup lens section and the image pickup device.

8. The biometric image pickup apparatus according to claim 1, wherein
   the transmittance distribution filter allows near-infrared light to pass through according to the transmittance distribution.

9. The biometric image pickup apparatus according to claim 1, wherein
   the image pickup lens section includes a plurality of microlenses.

10. The biometric image pickup apparatus according to claim 1, wherein
    the image pickup device obtains image pickup data of veins of the living organism.

11. The biometric image pickup apparatus according to claim 1, further comprising:
    an authentication section performing authentication of the living organism on the basis of image pickup data obtained in the image pickup device.

12. The biometric image pickup apparatus according to claim 11, further comprising:
    a pattern storing section configured to store a biometrics authentication pattern for use by the authentication section.

13. The biometric image pickup apparatus according to claim 1, further comprising:
    a micro lens array that includes a plurality of microlenses arranged in a matrix form and placed below the transmittance distribution filter such that an image of a desired observation on plane inside the living organism is formed on a light-receiving plane on the image pickup device.

14. The biometric image pickup apparatus according to claim 13, wherein
    each microlense of the plurality of microlenses are configured to change a focal position to facilitate double biometric authentication that includes vein authentication and fingerprint authentication.

* * * * *